United States Patent [19]

Gillet

[11] Patent Number: 4,861,182

[45] Date of Patent: Aug. 29, 1989

[54] DEVICE FOR FIXING AN ELEMENT ON AN OUTER SURFACE OF A SUPPORT WALL OF A HOLLOW BODY

[75] Inventor: Guy Gillet, Marines, France

[73] Assignees: Automobiles Peugeot, Paris; Automobiles Citroen, Neuilly/Seine, both of France

[21] Appl. No.: 126,935

[22] Filed: Nov. 30, 1987

[30] Foreign Application Priority Data

Dec. 2, 1986 [FR] France .................... 86 16820

[51] Int. Cl.⁴ .............................................. F16B 9/00
[52] U.S. Cl. ........................................ 403/264; 403/8; 403/407.1; 411/104; 411/112; 411/522
[58] Field of Search .............. 403/8, 233, 260, 264, 403/6, 254, 407.1; 411/84, 85, 104, 108, 112, 174, 175, 522

[56] References Cited

U.S. PATENT DOCUMENTS

| | | | |
|---|---|---|---|
| 641,895 | 1/1900 | Scovill | 403/8 |
| 1,346,518 | 7/1920 | Waggoner | 403/8 X |
| 1,983,860 | 12/1934 | Tourneau | 403/8 |
| 2,552,499 | 5/1951 | Tinnerman | 411/112 |
| 2,611,633 | 9/1952 | Webster | 403/264 X |
| 2,883,011 | 4/1959 | Flora | 403/241 |
| 3,967,432 | 7/1976 | Starr | 403/407.1 X |
| 4,124,317 | 11/1978 | Dauth | 403/8 |
| 4,139,314 | 2/1979 | Albern | 403/407.1 X |
| 4,671,552 | 6/1987 | Anderson et al. | 403/260 X |

FOREIGN PATENT DOCUMENTS

| | | | |
|---|---|---|---|
| 345893 | 2/1920 | Fed. Rep. of Germany | 403/8 |
| 1028684 | 5/1966 | United Kingdom . | |

Primary Examiner—Gary L. Smith
Assistant Examiner—Douglas E. Ringel
Attorney, Agent, or Firm—Burns, Doane, Swecker & Mathis

[57] ABSTRACT

A device for fixing an element to an outer surface of a support wall of a hollow body in proximity to a first partition wall of this body perpendicular to said surface, including a bolt which extends through a part of the element and said support wall and cooperates with a nut bearing against an inner wall of the hollow body, parallel to said outer surface, wherein the nut is constituted by a plate in which is provided at least one tapped hole and to which is elastically fixed a fastener extending through an opening in the first partition wall. This opening permits the introduction of the plate, the fastener being itself elastically fixed to the first partition wall.

6 Claims, 1 Drawing Sheet

DEVICE FOR FIXING AN ELEMENT ON AN OUTER SURFACE OF A SUPPORT WALL OF A HOLLOW BODY

BACKGROUND OF THE INVENTION

The present invention relates to devices for fixing an element on an outer surface of a support wall of a hollow body in proximity to a first partition wall of this body, perpendicular to said surface, this device comprising a screw which extends through a part of the element and said support wall and cooperates with a nut bearing against an inner wall of the hollow body which is parallel to said outer surface.

A number of fixing devices are known in the art for this type of applications.

Thus, for example, devices are known which comprise nuts having bosses to be welded. However, these devices do not permit the replacement of the elements in the hollow body without effecting an intervention on the latter. Further, this type of device requires a precise positioning of the various component elements of the device.

Devices are also known which comprise nuts in a cage having tabs engaged in an opening provided adjacent to an aperture for the passage of the screw in the wall against which the part to be fixed bears. This opening weakens this wall and is liable to result in a deformation in the region of the fastening which results in an initiation of fracture of the hollow body.

An object of the invention is therefore to overcome these problems by providing a fixing device which is easily removed and does not substantially weaken the hollow body.

SUMMARY OF THE INVENTION

The invention therefore provides a fixing device of the type described hereinbefore, wherein the nut is constituted by a plate in which is provided at least one tapped hole and to which is elastically fixed a fastener extending through said first partition wall through an opening which permits the introduction of the plate, the fastener being itself elastically fixed to said first partition wall.

According to other features:

as the hollow body has a second partition wall parallel to the first partition wall and the plate is supported between these two walls on the inner wall spaced from the support wall, this inner wall is constituted by two tabs respectively cut from each of the partition walls and formed over in opposed relation to each other, and a tubular spacer member adapted to be traversed by the screw is interposed between the end of the tabs and said support wall;

the fastener comprises two elastically yieldable strips which surround the plate and are hooked thereto owing to respective complementary corrugated shapes of each strip and of the contour of the plate;

the fastener has a base which bears against the outer edge of the opening and the two strips bear by their bent end portions against the inner edge of this opening.

A better understanding of the invention will be had from the following description which is given solely by way of example with reference to the accompanying drawings, in which:

DESCRIPTION OF THE PREFERRED EMBODIMENT

Figure 1:
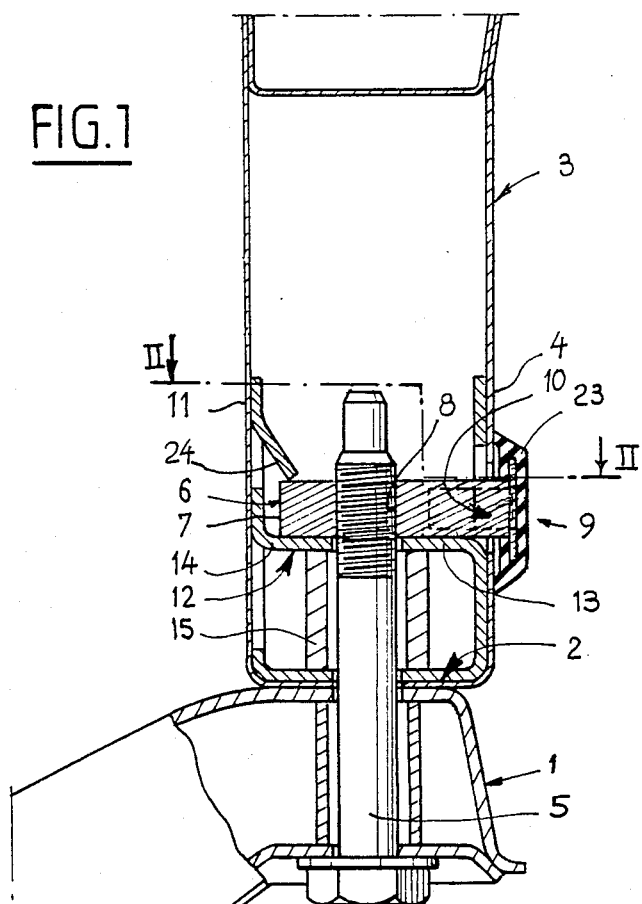
FIG. 1 is a side elevational and sectional view of a device according to the invention.
Figure 2:
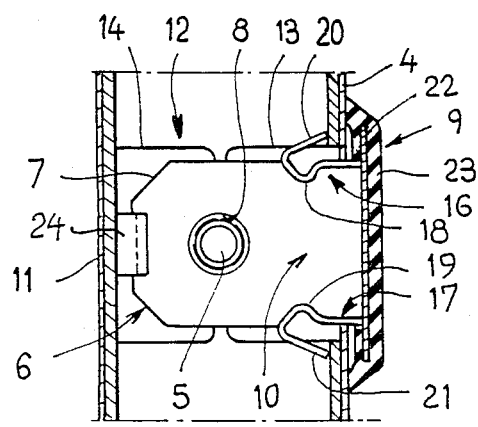
FIG. 2 is a sectional view taken on line 2—2 of FIG. 1.

As can be seen in FIGS. 1 and 2, the fixing device according to the invention permits the fixing of an element 1 to an outer surface of a support wall 2 of a hollow body 3 in proximity to a first partition wall 4 of this body, this first partition wall 4 being perpendicular to the outer surface of the support wall 2. This device comprises a bolt 5 which extends through a part of the element 1 and the support wall 2 and cooperates with a nut 6.

In the device according to the invention, this nut is formed by a plate 7 in which is provided at least one tapped hole 8 and to which is elastically fixed a fastener 9. This fastener extends through the first partition wall 4 of the hollow body through an opening 10 which also permits the introduction of the plate in this hollow body. The fastener 9 is also elastically fixed to the first partition wall 4, as will be described hereinafter.

The hollow body 3 also includes a second partition wall 11 parallel to the first-mentioned partition wall and the plate 7 bears, between these two partition walls, against an inner wall 12 of the hollow body which is spaced from the support wall 2 of the hollow body and is parallel to the latter and more particularly to the outer surface of this support wall 2.

This inner wall 12 is constituted by two tabs 13 and 14 cut from each of the two partition walls 4 and 11 of the hollow body 3 and formed over in facing relation to each other.

A tubular spacer member 15 through which the screw 5 extends is interposed between the end of the tabs 13 and 14 constituting the inner wall 12 of this hollow body and the support wall 2 of the latter.

Figure 3:
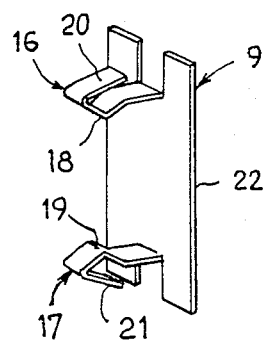
FIG. 3 is a perspective view of a fastener forming part of the device.

As can be seen more clearly in FIGS. 2 and 3, the fastener 9 has two elastically yieldable strips 16 and 17 having corrugated shapes 18 and 19 which cooperate with complementary shapes of the plate 7 for its elastic hooking to the latter.

These elastically yieldable strips of the fastener also have bent end portions 20 and 21 which bear against the inner edge portion of the opening 10 for locking the assembly in position. For this purpose, the fastener also has a base 22 which bears against the outer edge portion of the opening 10.

If need be, a flexible sealing element 23 surrounding the base 22 of the fastener and fixed to the latter, may be interposed between this base and the outer edge portion of the opening 10 for the purpose of closing the latter and rendering it fluidtight.

Furthermore, a tab 24 for positioning the plate may also be provided, for example, on the second partition wall 11 of the hollow body.

The assembly of such a device is extremely simple and rapid and comprises fixing the fastener to the plate, then introducing this assembly into the hollow body 3 through the opening 10 and lastly pushing on this fastener until the bent end portions 20 and 21 of the fastener are in a position for hooking to the inner edge portion of this opening. It will be understood that the sealing element will have been previously disposed around the base 22 of the fastener, should such an element be used.

This assembly is removed by disengaging the fastener to permit the withdrawal of the plate.

It will be understood that the plate 7 could have a plurality of tapped holes adapted to cooperate, for example, with a plurality of bolts.

The proposed device has been found to be simple and reliable, in particular owing to the absence of an opening in the support surface, to the fluidtightness provided by the sealing element, and to the notable length of the bolt, which permits increasing the reliability of the fixing by a suitable tightening torque.

What is claimed is:

1. A device for fixing an element to an outer surface of a support wall of a hollow body which comprises a second wall substantially perpendicular to said outer surface and inner wall means substantially parallel to said outer surface, an opening being provided in said second wall, said element being in proximity to said second wall, said device comprising a bolt which extends through a part of said element and said support wall, a plate defining at least one tapped hole and bearing against said inner wall means and screw threadedly engaged with the bolt, and a fastener elastically fixed to said plate and extending through said opening in said second wall, the opening permitting the introduction of the plate, and elastically yieldable means directly engaging the second wall thereby securing the fastener to the second wall.

2. A fixing device according to claim 1, wherein the elastically yieldable means comprise two elastically yieldable strips which are on each side of the plate, and interengaging complementary corrugated portions on each strip and on edges of the plate securing the plate to the fastener.

3. A device for fixing an element to an outer surface of a support wall of a hollow body which comprises a second wall substantially perpendicular to said outer surface and inner wall means substantially parallel to said outer surface, an opening being provided in said second wall, said element being in proximity to said second wall, said device comprising a bolt which extends through a part of said element and said support wall, a plate defining at least one tapped hole and bearing against said inner wall means and screw threadedly engaged with the bolt, and a fastener extending through said opening in said second wall, the opening permitting the introduction of the plate, and elastically yieldable means securing the fastener to the plate and to the second wall, wherein the hollow body includes a third wall substantially parallel to the second wall, and the plate bears, between the second and third walls, against said inner wall means which are spaced from the support wall and comprise two tabs cut out from each of the second and third walls and formed over into alignment with each other, and a tubular spacer member through which the bolt extends is interposed between end portions of the tabs and the support wall.

4. A fixing device according to claim 3, further comprising a positioning tab for the plate provided on said third wall.

5. A device for fixing an element to an outer surface of a support wall of a hollow body which comprises a second wall substantially perpendicular to said outer surface and inner wall means substantially parallel to said outer surface, an opening being provided in said second wall, said element being in proximity to said second wall, said device comprising a bolt which extends through a part of said element and said support wall, a plate defining at least one tapped hole and bearing against said inner wall means and screw threadedly engaged with the bolt, and a fastener extending through said opening in said second wall, the opening permitting the introduction of the plate, and elastically yieldable means securing the fastener to the plate and to the second wall, wherein the elastically yieldable means comprise two elastically yieldable strips which are on each side of the plate, and interengaging complementary corrugated portions on each strip and on edges of the plate securing the plate to the fastener; and wherein the fastener comprises a base which bears against said second wall adjacent to said opening and the two elastically yieldable strips of the fastener include bent end portions in abutting relation to said second wall adjacent to said opening.

6. A fixing device according to claim 5, wherein a flexible sealing element surrounds and is fixed to the base and is interposed between the base and an outer surface of said second wall adjacent to said opening for closing the opening.

* * * * *